United States Patent
Ollmann et al.

(10) Patent No.: US 7,836,408 B1
(45) Date of Patent: Nov. 16, 2010

(54) METHODS AND APPARATUS FOR DISPLAYING RELATIVE EMPHASIS IN A FILE

(75) Inventors: Ian R. Ollmann, San Mateo, CA (US); Nathan T. Slingerland, Capitola, CA (US); Sanjay K. Patel, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1003 days.

(21) Appl. No.: 10/825,251

(22) Filed: Apr. 14, 2004

(51) Int. Cl.
*G06F 3/048* (2006.01)

(52) U.S. Cl. ................ 715/787; 715/786; 707/723; 707/728; 707/729; 707/748; 707/750

(58) Field of Classification Search .............. 715/787
See application file for complete search history.

(56) References Cited

U.S. PATENT DOCUMENTS

| | | | | |
|---|---|---|---|---|
| 5,479,600 | A * | 12/1995 | Wroblewski et al. | 715/787 |
| 5,592,604 | A * | 1/1997 | Marusak | 715/787 |
| 5,623,588 | A * | 4/1997 | Gould | 715/787 |
| 5,644,692 | A * | 7/1997 | Eick | 715/833 |
| 5,692,176 | A * | 11/1997 | Holt et al. | 707/5 |
| 6,256,622 | B1 * | 7/2001 | Howard et al. | 707/3 |
| 6,334,132 | B1 * | 12/2001 | Weeks | 707/101 |
| 6,339,437 | B1 * | 1/2002 | Nielsen | 715/787 |
| 6,457,026 | B1 * | 9/2002 | Graham et al. | 715/234 |
| 6,778,192 | B2 * | 8/2004 | Arbab et al. | 715/786 |
| 6,970,881 | B1 * | 11/2005 | Mohan et al. | 707/102 |
| 6,990,496 | B1 * | 1/2006 | McGee et al. | 707/101 |
| 7,103,851 | B1 * | 9/2006 | Jaeger | 715/786 |
| 7,228,492 | B1 * | 6/2007 | Graham | 715/234 |
| 7,495,795 | B2 * | 2/2009 | Graham et al. | 358/1.18 |
| 7,660,813 | B2 * | 2/2010 | Milic-Frayling et al. | 707/999.102 |
| 2004/0260677 | A1 * | 12/2004 | Malpani et al. | 707/3 |
| 2005/0091604 | A1 * | 4/2005 | Davis | 715/772 |
| 2005/0210403 | A1 * | 9/2005 | Satanek | 715/786 |

OTHER PUBLICATIONS

Kline, "Principles and Practice of Structural Equation Modeling", Dec. 2002, Guilford Press, pp. 1, 23, 24, http://web.archive.org/web/20021226073805/http://www2.chass.ncsu.edu/garson/pa765/kline.htm.*

Coffee, P., "OS X 10.3 Dazzles Developers", Nov. 3, 2003 http://www.eweek.com/article2/0,1895,1498413,00.asp Downloaded from the Internet Feb. 8, 2006 2 pages.

"Apple Introduces Xcode, the Fastest Way to Create Mac OS X Applications", Jun. 23, 2003 http://www.apple.com/pr/library/2003/jun/23xcode.html Downloaded from the Internet Feb. 8, 2006 2 pages.

* cited by examiner

*Primary Examiner*—Alvin H Tan
(74) *Attorney, Agent, or Firm*—Beyer Law Group LLP

(57) ABSTRACT

Methods and apparatus for providing a scroll bar including a plurality of locations corresponding to a plurality of locations in a file are disclosed. One or more location criteria that are obtained are used to identify one or more desired locations in the file. One or more display criteria to be applied to designate the one or more desired locations are identified. In addition, one or more desired locations in the file are located according to the location criteria. The scroll bar is then displayed by applying the display criteria to one or more locations of the scroll bar corresponding to the desired locations in the file.

20 Claims, 9 Drawing Sheets

FIG. 1

| Samples | Address | | Code | Cycles | ! | Comment | Source |
|---|---|---|---|---|---|---|---|
| | 0x9083129c | stfd | f2, -96(r1) | 3:3 | | | |
| | 0x908312a0 | stfd | f3, -88(r1) | 3:3 | | | |
| | 0x908312a4 | stfd | f4, -80(r1) | 3:3 | | | |
| | 0x908312a8 | stfd | f5, -72(r1) | 3:3 | | | |
| | 0x908312ac | stfd | f6, -64(r1) | 3:3 | | | |
| | 0x908312b0 | stfd | f7, -56(r1) | 3:3 | | | |
| | 0x908312b4 | stfd | f8, -48(r1) | 3:3 | | | |
| | 0x908312b8 | stfd | f9, -40(r1) | 3:3 | | | |
| | 0x908312bc | stfd | f10, -32(r1) | 3:3 | | | |
| | 0x908312c0 | stfd | f11, -24(41) | 3:3 | | | |
| | 0x908312c4 | stfd | f12, -16(r1) | 3:3 | | | |
| | 0x908312c8 | stfd | f13, -8(r1) | 3:3 | | | |
| | 0x908312cc | stfd | r1, -160(r1) | 3:1 | | | |
| | 0x908312d0 | lwz | r3, 0(r3) | 3:1 | | | |
| | 0x908312d4 | bl | $+524 < _class_loo | 1:1 | | | |
| | 0x908312d8 | mr | r12, r3 | *2:2 | | | |
| | 0x908312dc | mtctr | r3 | 3:1 | | Stall = 2 | |
| | 0x908312e0 | lwz | r1, 0(r1) | 3:1 | | Stall = 2 | |
| | 0x908312e4 | lwz | r0, 8(r1) | *2:2 | ! | Serializing | |
| | 0x908312e8 | mtlr | r0 | 4:1 | | | |
| | 0x908312ec | lfd | f1, -104(r1) | 4:1 | | | |
| | 0x908312f0 | lfd | f2, -96(r1) | 4:1 | | | |
| | 0x908312f4 | lfd | f3, -88(r1) | 4:1 | | | |
| | 0x908312f8 | lfd | f4, -80(r1) | 4:1 | | | |

13 of 127 samples (10.2%), 1 of 88 instructions (1.1%) selected

CPU Model: 7450

| Samples | Address | | Code | | Cycles | Comment | Source |
|---|---|---|---|---|---|---|---|
| 3.5% | 0x90831220 | cmplwi | r3, 0x000 | | 1:1 | | |
| | 0x90831224 | beq | $+292 <objc_msgSer | | 1:1 | | |
| 5.3% | 0x90831228 | lwz | r12, 0(r3) | | 3:1 | Stall=2, Loop | |
| 14.2% | 0x9083122c | lwz | r12, 32(r12) | | 3:1 | Stall=1 | |
| 13.3% | 0x90831230 | stw | r9, 48(r1) | | 3:1 | | |
| 3.5% | 0x90831234 | lwz | r11, 0(r12) | | 3:1 | Stall=1 | |
| | 0x90831238 | addi | r9, r12, 8 | | 1:1 | | |
| 12.4% | 0x9083123c | slwi | r11, r11, 2 | | 1:1 | | |
| 0.9% | 0x90831240 | and | r12, r4, r11 | | 1:1 | | |
| 2.7% | 0x90831244 | lwzx | r2, r9, r12 | | 3:1 | Stall=1, Loop | |
| | 0x90831248 | addi | r12, r12, 4 | | 1:1 | | |
| 16.8% | 0x9083124c | cmplwi | r2, 0x000 | | 1:1 | | |
| 0.9% | 0x90831250 | beq | $+36 <objc_msgSer | | 1:1 | | |
| | 0x90831254 | lwz | r0, 0(r2) | | 3:1 | Stall=1 | |
| | 0x90831258 | and | r12, r12, r11 | | 1:1 | | |
| 15.0% | 0x9083125c | cmplwi | r0, r4 | | 1:1 | | |
| | 0x90831260 | bne | $-28 <objc_msgSer | | 1:1 | Loop end[2] | |
| 0.9% | 0x90831264 | lwz | r12, 8(r2) | | 3:1 | Stall=2 | |
| 6.2% | 0x90831268 | mtctr | r12 | | *2:2 | | |
| 3.5% | 0x9083126c | lwz | r9, 48(r1) | | 3:1 | | |

*FIG. 2*

|  | Ref Count | Linear | Non-Linear |
|---|---|---|---|
| Granule 0 | 0 | 0.00 | 0.00 |
| Granule 1 | 4 | 0.17 | 0.42 |
| Granule 2 | 6 | 0.26 | 0.51 |
| Granule 3 | 0 | 0.00 | 0.00 |
| Granule 4 | 0 | 0.00 | 0.00 |
| Granule 5 | 0 | 0.00 | 0.00 |
| Granule 6 | 10 | 0.43 | 0.66 |
| Granule 7 | 3 | 0.13 | 0.36 |
| Granule 8 | 0 | 0.00 | 0.00 |
| Granule 9 | 0 | 0.00 | 0.00 |
| Granule N | X | Y | Z |
| Total | 23+ | | |

FIG. 8B      FIG. 8C

METHODS AND APPARATUS FOR DISPLAYING RELATIVE EMPHASIS IN A FILE

FIELD OF THE INVENTION

The present invention relates generally to displaying a file in a word processing program and, more specifically, to displaying relative emphasis in a file through modifying the manner in which a scroll bar is displayed.

BACKGROUND OF THE INVENTION

Numerous word processing programs are available for use in editing or viewing documents. These documents may include, for example, text, source code, or the results of compilation of source code. For instance, the results of compilation of source code may indicate errors that occurred during compilation of the source code.

In order to efficiently edit a document using a word processing program, a user commonly searches for a desirable term or phrase. Through the use of such a search, the desired location(s) within the document may be located. However, in some instances, the user may not easily search for desired locations in a particular document. For instance, a software programmer may be interested in optimizing a source code file or program. Although optimization is commonly performed in order to reduce the execution time required for a specific section of code, it is often difficult to ascertain which sections of code can most benefit from such optimization.

Another mechanism often used to navigate a file is what is commonly referred to as a "scroll bar." A scroll bar is typically located either at the left or right side of the page being viewed. The user may point the cursor at a location on the scroll bar and drag the cursor upward or downward to navigate the document quickly. However, as described above, in many instances, the user is not able to discern the location or particular item desired in a file, as in the case of navigating the results of a compilation. For these reasons and due to the large size of many files, this process is often time-consuming, tedious, and difficult.

In view of the above, it would be beneficial if a mechanism for efficiently navigating a document could be implemented. Moreover, it would be beneficial if a user could easily locate sections of code that could most benefit from optimization.

SUMMARY OF THE INVENTION

These and other features and advantages of the present invention will be presented in more detail in the following specification of the invention and the accompanying figures, which illustrate by way of example the principles of the invention.

The present invention enables a scroll bar to be displayed such that it provides indicators of the content or importance of the content of the file being viewed. This is accomplished, in part, through the use of one or more indicators such as color, hue, intensity, and/or degree of transparency. In this manner, a user may visually ascertain desired location(s) in the file by viewing the scroll bar.

In accordance with one aspect of the invention, the scroll bar is displayed to indicate the contents or relative importance of the contents of the file being viewed. Specifically, a scroll bar including a plurality of locations corresponding to a plurality of locations in a file is provided (e.g., displayed). Specifically, one or more location criteria that are obtained are used to identify one or more desired locations in the file. For instance, location criteria may indicate terms or phrases, such as "error" or "warning." One or more display criteria to be applied to designate the one or more desired locations are identified. For instance, display criteria may include a color, hue, intensity and/or degree of transparency. The desired locations in the file are located according to the location criteria. The scroll bar is then displayed by applying the display criteria to one or more locations of the scroll bar corresponding to the desired locations in the file.

In accordance with one embodiment of the invention, the contents of the file are also displayed using one or more visual indicators. Specifically, one or more locations in the file are displayed by applying the same display criteria used to display the scroll bar. In this manner, the user may easily ascertain those portions of the file that are most significant. Accordingly, through the use of visual indicators (e.g., display criteria), the contents of the file and the scroll bar are displayed to indicate the relative importance of locations in the file with respect to other locations in the file.

BRIEF DESCRIPTION OF THE DRAWINGS

The invention, together with further advantages thereof, may best be understood by reference to the following description taken in conjunction with the accompanying drawings in which:

FIG. 1 is a screen shot illustrating a scroll bar generated in accordance with one embodiment of the invention.

FIG. 2 is a screen shot illustrating the contents of a file displayed in accordance with one embodiment of the invention.

FIG. 8B depicts a histogram corresponding to the data structures depicted in FIG. 8A in accordance with one embodiment of the invention.

FIG. 8C depicts a scroll bar corresponding to the histogram depicted in FIG. 8B in accordance with one embodiment of the invention.

DETAILED DESCRIPTION OF THE INVENTION

Figure 3:
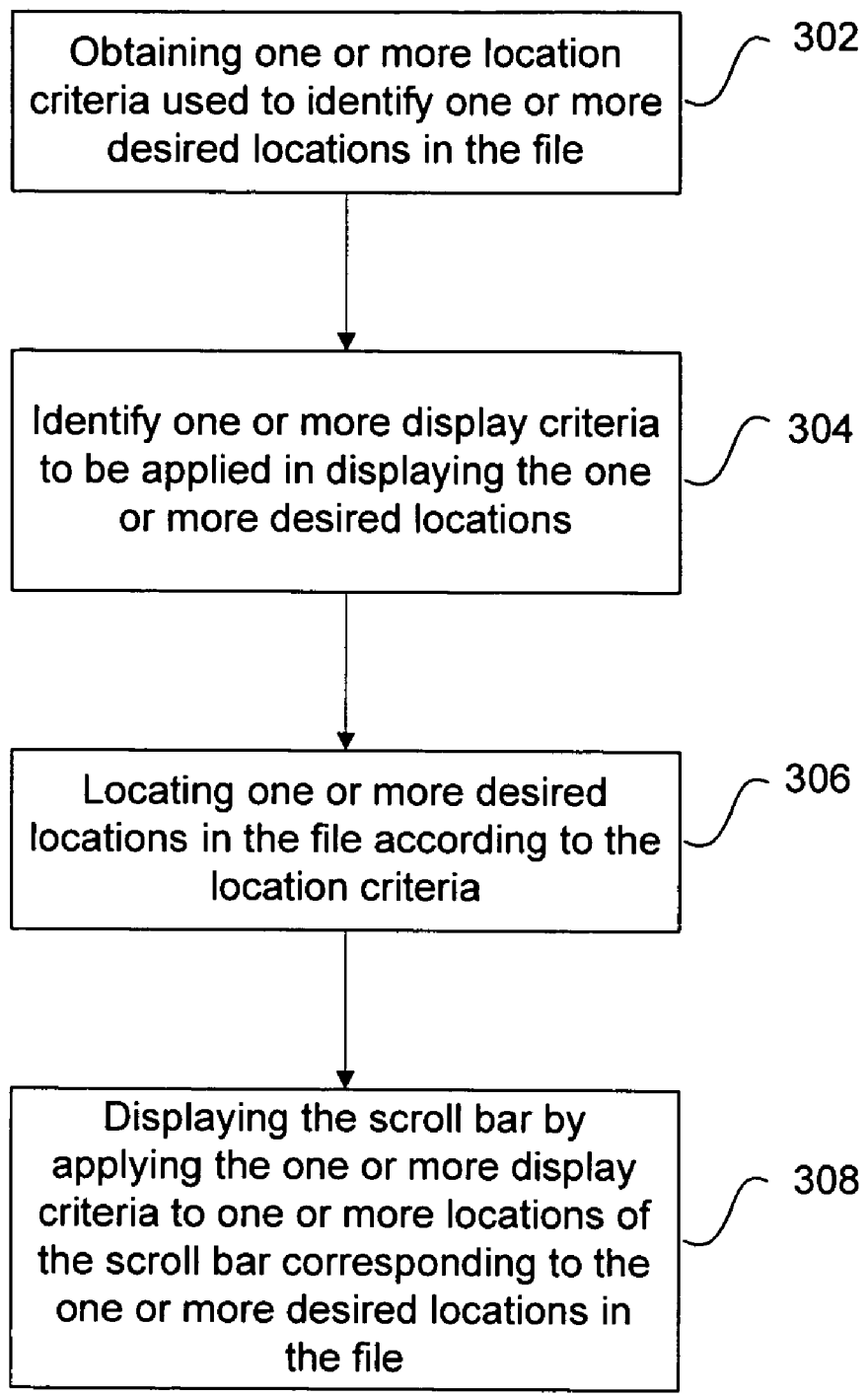
FIG. 3 is a process flow diagram illustrating a method of displaying a scroll bar in accordance with one embodiment of the invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

FIG. 1 is a screen shot illustrating a scroll bar generated in accordance with one embodiment of the invention. As shown in FIG. 1, a scroll bar is generated such that segments of the scroll bar indicate relative importance of the contents in the corresponding locations of the displayed file. In this example, the scroll bar includes one or more horizontal segments, each of the horizontal segments indicating relative importance of contents of the displayed file. For instance, each of the horizontal segments may exhibit a variation in color, hue, intensity and/or transparency indicating the relative importance of contents of the file in those locations with respect to contents of the file in other locations. Such display criteria may be pre-configured or configurable by a user to indicate relative importance. Display criteria may also be configured such that the display criteria are associated with various location criteria used to search for various locations within a file (e.g., terms or phrases within a file). For instance, a user may choose a specific color, hue, intensity and/or transparency to indicate segments of the file including specific search terms and/or phrases. As one example, a user may choose the color yellow to display warnings and the color red to display errors.

In addition to display criteria, it may be desirable to configure background display criteria. Specifically, background display criteria may be used to display portions of the scroll bar corresponding to locations in the file that do not include the desired locations. For instance, background display criteria may be used to display one or more locations of the scroll bar that correspond to locations in the file that do not include specified search terms or phrases. Background display criteria may include a color, hue, intensity and/or degree of transparency that is pre-configured or configurable by a user.

Relative importance may be ascertained, for example, through identification of various search terms or phrases or other location criteria used to search for various locations within a file. For instance, a user may configure the system to search for specific terms or phrases. Alternatively, the system may be statically configured to search for specific terms or phrases. As one example, compiled code may be searched for errors and/or warnings.

Through the use of the present invention, a user may ascertain those locations of a file that are most significant by viewing the scroll bar. The user may then choose to view those corresponding locations of the file by moving the mouse or cursor upward or downward along the scroll bar. In this manner, a user may easily view, edit or otherwise modify a file. It should be noted that an exemplary appearance of the scroll bar is depicted in FIG. 8C.

In accordance with one embodiment, the contents of the file at locations of the file (e.g., corresponding to the scroll bar) are also displayed to indicate relative importance of the locations of the file. For instance, the rows in the file (or portions thereof) may be displayed to indicate relative importance of the rows of the file with respect to one another. FIG. 2 is a screen shot illustrating the contents of a file displayed in accordance with one embodiment of the invention. In this example, rows in the file being viewed are displayed to indicate relative importance of the rows with respect to one another. It should be noted that an exemplary appearance of the scroll bar is depicted in FIG. 8C.

Figure 8A:
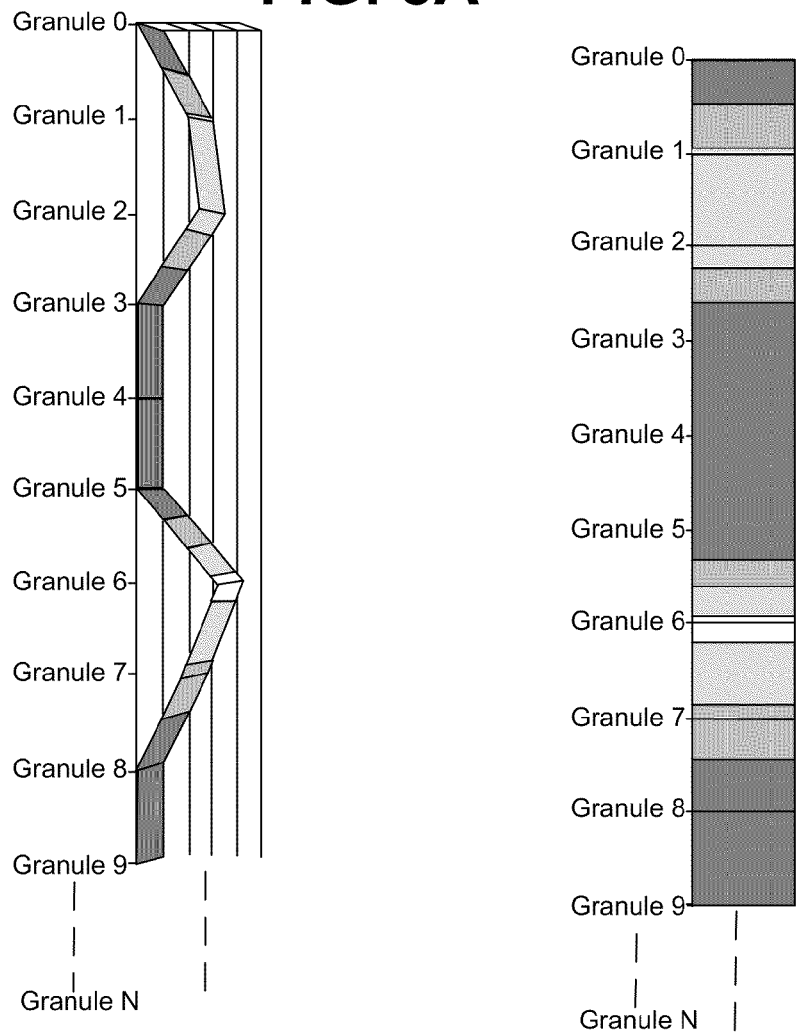
FIG. 8A is a diagram illustrating exemplary data structures used to store file data in accordance with one embodiment of the invention.

File data indicating relative importance of rows in the file may be represented using a variety of data structures. FIG. 8A is a diagram illustrating exemplary data structures used to store file data in accordance with one embodiment of the invention. FIG. 8B depicts a histogram corresponding to the data structures depicted in FIG. 8A in accordance with one embodiment of the invention. FIG. 8C depicts a scroll bar corresponding to the histogram depicted in FIG. 8B in accordance with one embodiment of the invention. Each row is represented by a granule object. Each granule object stores the row's reference count, the linear row reference count, and the non-linear row reference count. In this manner, the processed file data is represented for use in displaying the scroll bar and associated file contents as the user scrolls through the file. Each granule object may also store the text of the row and associated color. It should be noted that the appearance of the scroll bar depicted in FIG. 8C can change dynamically during scrolling when, for example, rows corresponding to granule objects 9-18 (not shown) are displayed.

Figure 4:
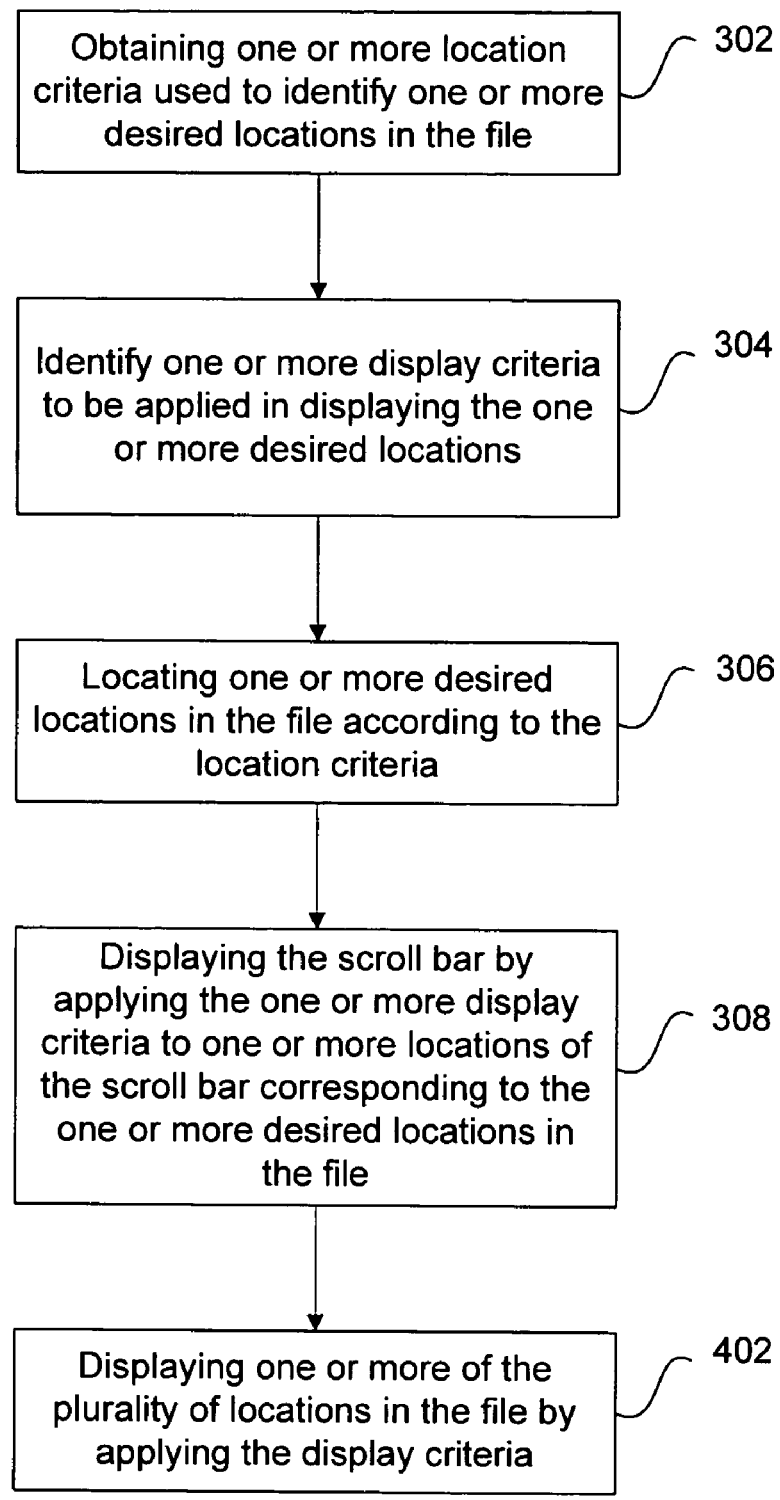
FIG. 4 is a process flow diagram illustrating a method of displaying a scroll bar and file contents in accordance with one embodiment of the invention.

In addition to displaying the scroll bar to indicate relative importance of contents of the file, it may also be desirable to also display the file contents to indicate the relative importance of the contents of the file. FIG. 4 is a process flow diagram illustrating a method of displaying a scroll bar and file contents in accordance with one embodiment of the invention. As described above with reference to FIG. 3, the scroll bar is displayed to indicate desired locations in the file. In accordance with one embodiment, the file contents (e.g., rows in the file) are also displayed to signify the desired locations in the file (e.g., corresponding to the visual indicators used to display the scroll bar). Thus, as shown at block 402, one or more locations in the file are displayed by applying the display criteria used to display the scroll bar. In addition, as described above, one or more locations in the file may also be displayed using background display criteria to indicate locations in the file that are not the desired locations (e.g., not those locations being searched for within the file).

As set forth above, location criteria may be configured or user-defined to indicate one or more locations that are "desired." For instance, the location criteria may be used to designate search terms or phrases, such as errors or warnings. In addition, the location criteria may also include one or more rankings associated with one or more content-dependent criteria. In this manner, relative importance of contents of the file may be specified or configured by a user.

Figure 5:
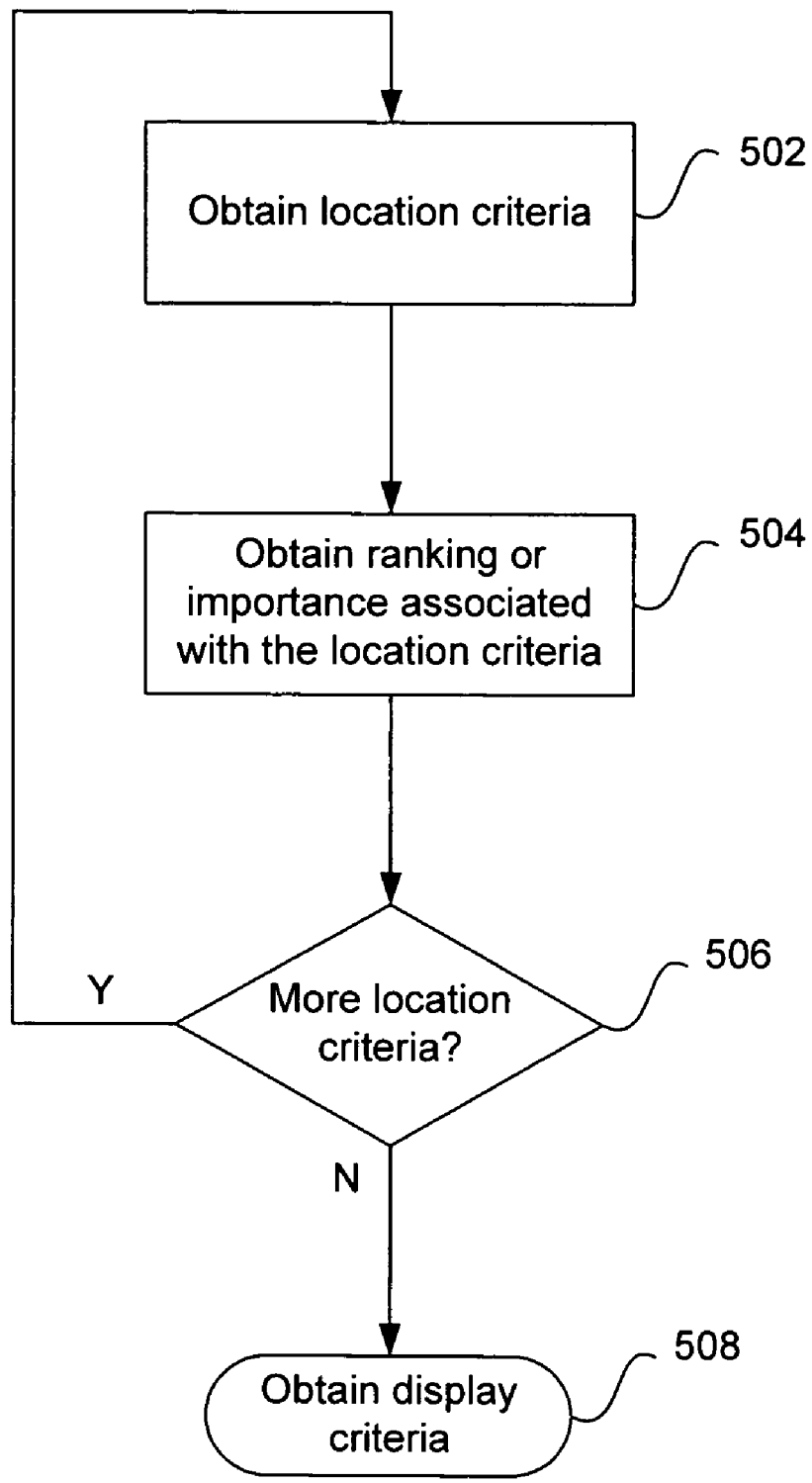
FIG. 5 is a process flow diagram illustrating a method of configuring location criteria in accordance with one embodiment of the invention.

As described above, location criteria may be statically configured or configured by a user. FIG. 5 is a process flow diagram illustrating a method of configuring location criteria in accordance with one embodiment of the invention. As shown at block 502, location criteria (e.g., search term or phrase) is obtained. A ranking or importance associated with the location criteria is then obtained at block 504. If it is determined at block 506 that there are more location criteria, the process repeats at block 502. The display criteria may then be obtained at block 508.

For example, the first location criteria obtained may indicate that errors within the file are to be located. The second location criteria obtained may indicate that warnings within the file are to be located. Display criteria indicating at least one of color, hue, intensity and/or transparency may then be obtained. For instance, errors may be displayed with the color red, while warnings may be displayed with the color yellow.

Figure 6:
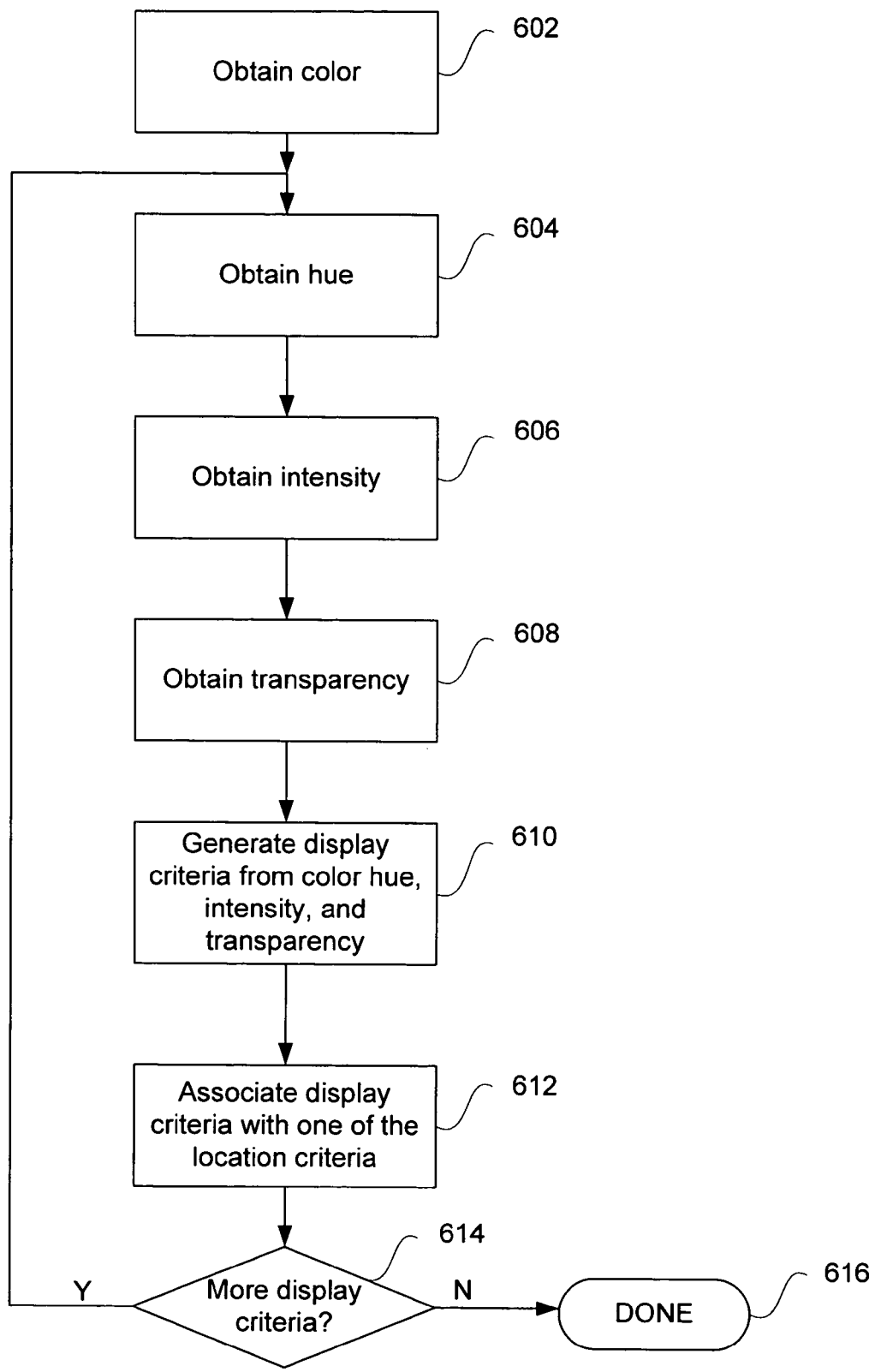
FIG. 6 is a process flow diagram illustrating a method of configuring display criteria in accordance with one embodiment of the invention.

As set forth above, display criteria may be configured or user-defined. The display criteria may indicate at least one of color, hue, intensity and/or transparency. FIG. 6 is a process flow diagram illustrating a method of configuring display criteria in accordance with one embodiment of the invention. As shown at block 602, a color may be obtained. In addition, a hue may be obtained at block 604. An intensity may be obtained at block 606, and an amount of transparency may be obtained at block 608. The display criteria may then be generated from at least one of the color, hue, intensity and transparency at block 610. The display criteria may then be associated with one or more of the location criteria obtained in FIG. 5 at block 612. The process repeats at block 614 for the remaining display criteria. When all display criteria have been associated with one or more of the location criteria, the process ends at block 616. In addition, as described above, background display criteria including at least one of color, hue, intensity and transparency may also be configured such that the background display criteria are used to display "background" pixels or portions of pixels within the scroll bar and/or file contents.

Figure 7:
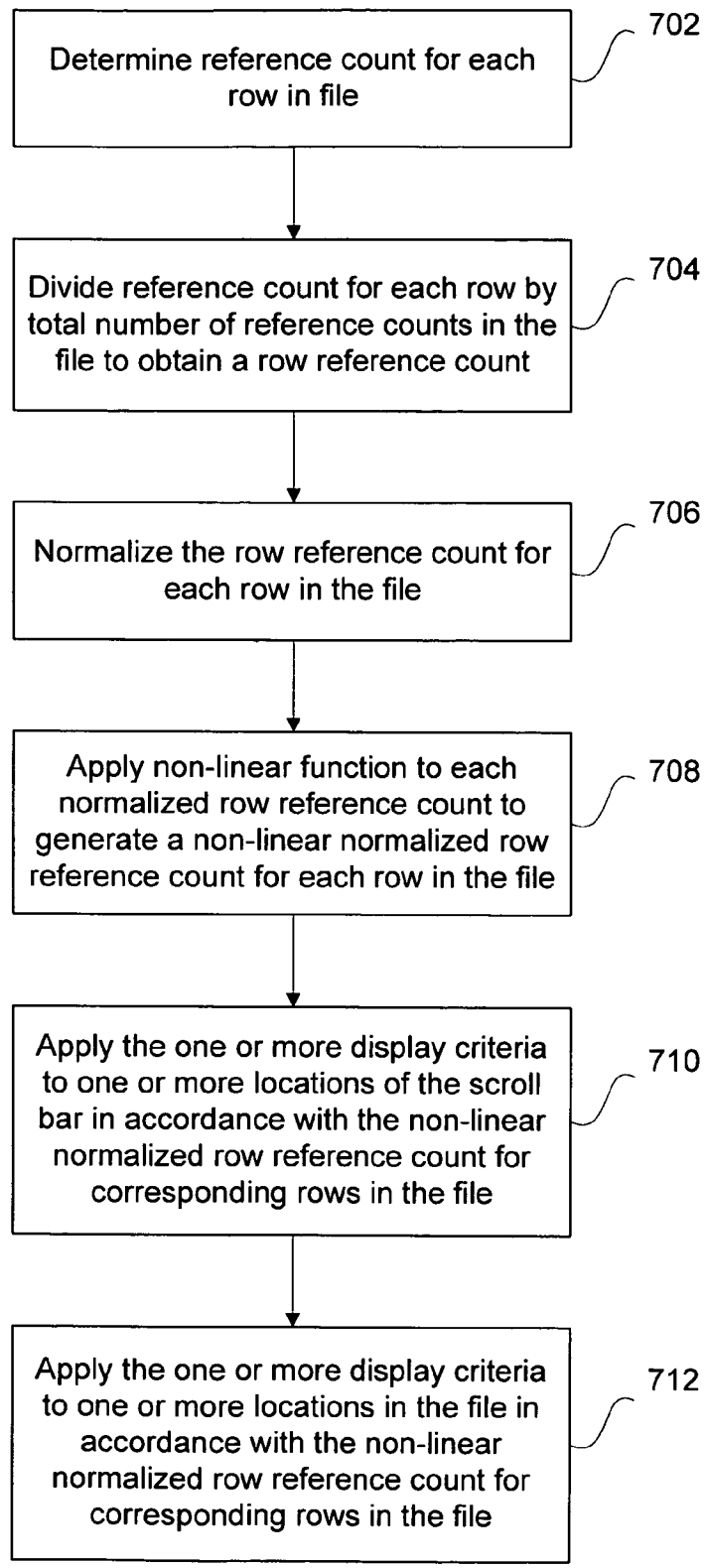
FIG. 7 is a process flow diagram illustrating a method of displaying a scroll bar and associated file contents by determining a reference count for rows in the file in accordance with one embodiment of the invention.

Relative importance of rows within a file may be ascertained and calculated using a variety of methods. FIG. 7 is a process flow diagram illustrating a method of displaying a scroll bar and associated file contents by determining a reference count for rows in the file in accordance with one embodiment of the invention. As shown at block 702, a reference count for each row in the file is determined, where the reference count indicates a number of the "desired" locations in the corresponding row. In other words, a reference count indicates the row's "importance" or "significance" with respect to other rows in the file. In this manner, the desired locations in the file are located using the location criteria that has been specified. In order to display the scroll bar, the one or more display criteria may then be applied to the one or more locations of the scroll bar in accordance with the reference count for corresponding rows in the file. In addition, as set forth above, the contents of the file may also be displayed using the same display criteria. Specifically, one or more locations in the file may be displayed by applying the one or more display criteria to the one or more of the plurality of locations in the file in accordance with the reference count for corresponding rows in the file.

In accordance with one embodiment, the reference count for each row in the file is divided by a total number of reference counts in the file to obtain a row reference count at block 704. In this manner, the significance of a row in relation to other rows in the file may be ascertained. The display criteria may then be applied accordingly. For instance, a row with a greater reference count may be displayed with a greater intensity than a row with a lower reference count. In order to consolidate this information, the row reference count for each row in the file is normalized at block 706. The one or more display criteria may then be applied to one or more locations of the scroll bar by applying the display criteria to the locations of the scroll bar in accordance with the normalized row reference count for corresponding rows in the file. In addition, the display criteria may be applied to one or more locations in the file in accordance with the normalized row reference count for corresponding rows in the file.

While the normalized row reference count consolidates the significance of the rows in relation to one another to a value between 0 and 1, this distinction may not be sufficient for the naked eye to perceive. For instance, the difference in hue or brightness may not be distinguishable. In order to further delineate the differences between the rows and therefore further exaggerate the display criteria so that the distinction can be perceived by the naked eye, a second function is applied to the normalized values. This may be accomplished by applying a non-linear function to each normalized row reference count to generate a non-linear normalized row reference count for each row in the file at block 708. For instance, the non-linear function may be a square-root function or squared function. The scroll bar is then displayed by applying the display criteria to one or more locations of the scroll bar in accordance with the non-linear normalized row reference count for corresponding rows in the file as shown at block 710. In addition, the contents of the file may also be displayed using the same display criteria. Specifically, the file is displayed by applying the display criteria to one or more locations in the file in accordance with the non-linear normalized row reference count for corresponding rows in the file as shown at block 712. For instance, those row(s) with the highest reference count may be displayed with the most color, while those row(s) with the lowest reference count may be displayed with the least color.

File data indicating relative importance of rows in the file may be represented using a variety of data structures. FIG. 8 is a diagram illustrating exemplary data structures used to store file data in accordance with one embodiment of the invention. Each row is represented by a granule object. Each granule object stores the row's reference count, the linear row reference count, and the non-linear row reference count. In this manner, the processed file data is represented for use in displaying the scroll bar and associated file contents as the user scrolls through the file. Each granule object may also store the text of the row and associated color.

In accordance with one embodiment, a table view program is configured for displaying rows in the file. A scroller program adapted for performing the above-described processes may be configured for overriding the display functions associated with the scroll bar, as well as the file contents. Specifically, the scroller program may communicate with the table view program to request the number of rows in the scroll bar (e.g., those rows that the user has selected). In addition, the scroller program may also request the information associated with those rows (e.g., the text and associated reference count information). From this information, the scroller program may display the appropriate rows and scroll bar segment.

The present invention may used to display the scroll bar and/or file contents such that the importance or significance of the file contents are visually displayed. The distinction between the display criteria may be displayed at the pixel level. Alternatively, the distinction may be displayed at the sub-pixel level.

Figure 9:
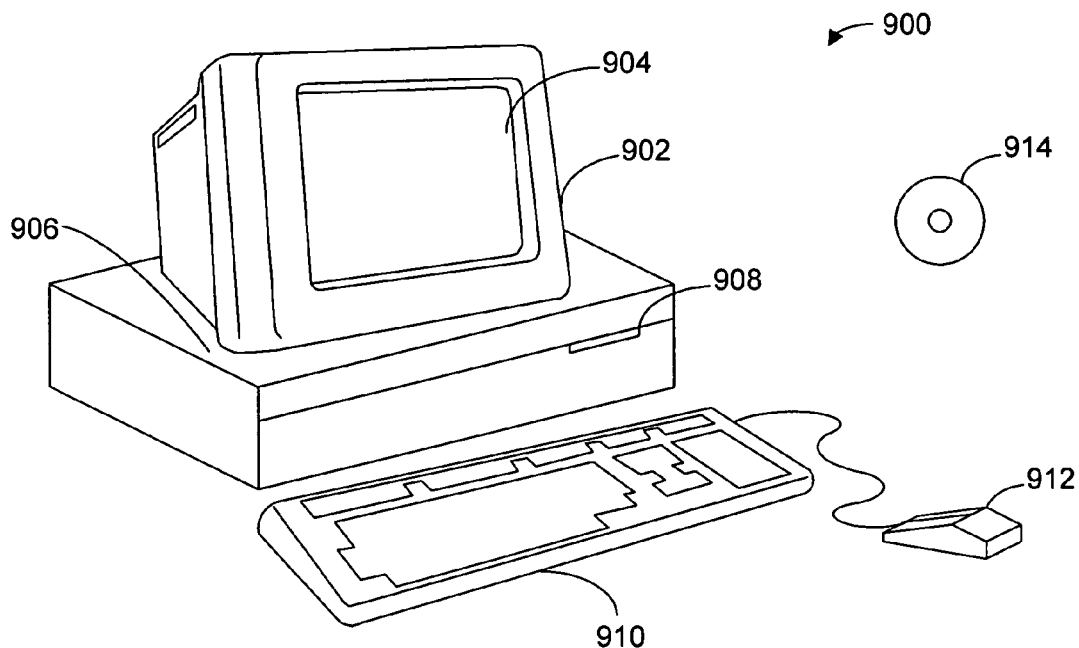
FIGS. 9 and 10 together illustrate a computer system suitable for implementing embodiments of the present invention.
Figure 10:
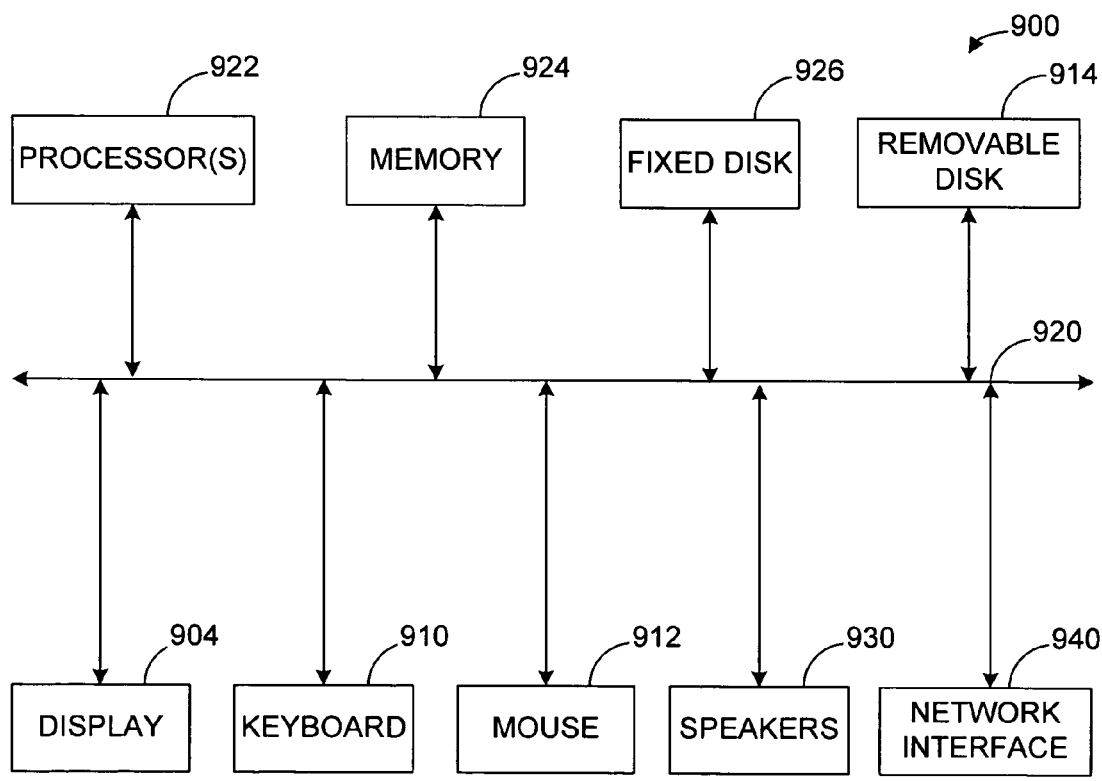

FIGS. 9 and 10 illustrate a computer system 1000 suitable for implementing embodiments of the present invention. FIG. 9 shows one possible physical form of the computer system. Of course, the computer system may have many physical forms ranging from an integrated circuit, a printed circuit board and a small handheld device up to a huge super computer. Computer system 1000 includes a monitor 1002, a display 1004, a housing 1006, a disk drive 1008, a keyboard 1010 and a mouse 1012. Disk 1014 is a computer-readable medium used to transfer data to and from computer system 1000.

FIG. 10 is an example of a block diagram for computer system 1000. Attached to system bus 1020 are a wide variety of subsystems. Processor(s) 1022 (also referred to as central processing units, or CPUs) are coupled to storage devices including memory 1024. In one embodiment, the processor(s) 1022 can be a VLIW processor. Memory 1024 includes random access memory (RAM) and read-only memory (ROM). As is well known in the art, ROM acts to transfer data and instructions uni-directionally to the CPU 1022 and RAM is used typically to transfer data and instructions in a bi-directional manner. Both of these types of memories may include any suitable of the computer-readable media described below. A fixed disk 1026 is also coupled bi-directionally to CPU 1022; it provides additional data storage capacity and may also include any of the computer-readable media described below. Fixed disk 1026 may be used to store programs, data and the like and is typically a secondary storage medium (such as a hard disk) that is slower than primary storage. It will be appreciated that the information retained within fixed disk 1026, may, in appropriate cases, be incorporated in standard fashion as virtual memory in memory 1024. Removable disk 1014 may take the form of any of the computer-readable media described below.

CPU 1022 is also coupled to a variety of input/output devices such as display 1004, keyboard 1010, mouse 1012 and speakers 1030. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1022 optionally may be coupled to another computer or telecommunications network using network interface 1040. With such a network interface, it is contemplated that the CPU might receive information from the network, or might output information to the network in the course of performing the above-described method steps. Furthermore, method embodiments of the present invention may execute solely upon CPU 1022 or may execute over a network such as the Internet in conjunction with a remote CPU that shares a portion of the processing.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A method comprising:
   calculating the number of times a key word or phrase appears in a file, the file having a plurality of locations and comprising at least one of the key word or phrase;
   for each of the locations of the file:
      calculating the number of times the key word or phrase appears in the location; and
      dividing the number of times the key word or phrase appears in the location by the number of times the key word or phrase appears in the file to arrive at a relative importance value for the location; and
   displaying a vertical scroll bar having a scroll thumb, the scroll bar having a plurality of segments each of which is visually distinctive and associated with one of the plurality of locations having one of the relative importance values, each segment being about the width of the scroll bar and indicating to a user a relative importance of the associated location of the file with respect to other locations in the file based on the relative importance value of the associated location of the file, by scanning only in a vertical direction, wherein in order to navigate directly to a particular file location having one of the relative importance values, a user views only the plurality of segments in the scroll bar, identifies a visually distinctive segment corresponding to the specific relative importance value, and moves the scroll thumb only in a vertical direction directly to the visually distinctive segment.

2. The method of claim 1, wherein the segments are displayed using a different color for different levels of relative importance.

3. The method of claim 1, wherein the segments are displayed using a different intensity for different levels of relative importance.

4. The method of claim 1, wherein the segments are displayed using a different transparency setting for different levels of relative importance.

5. A method comprising:
   identifying locations of interest within a file, the file comprising at least one key word or phrase;
   calculating a relative importance value for each of the locations of interest relative to each other, the calculating comprising:
      determining the number of times the key word or phrase appears in the file;
      calculating the number of times the key word or phrase appears in the location; and
      dividing the number of times the key word or phrase appears in the location by the number of times the key word or phrase appears in the file;
   displaying a content window containing a section of the file;
   displaying a vertical scroll bar having a scroll thumb movable vertically in the scroll bar;
   displaying location objects within the scroll bar each of which corresponds to one of the locations of interest of the file having one of the calculated relative importance values, wherein each of the location objects is about the width of the scroll bar, includes visual indications of a relative importance of the corresponding location in the file based on the calculated relative importance value for the corresponding location, and can be scanned by a user in a vertical direction to determine the relative importance of the corresponding location of interest, such that, when the scroll thumb is manipulated to one of the location objects, the section of the file displayed in the content window changes to a section corresponding to the one of the location objects within the scroll bar.

6. The method of claim 5, wherein the locations of interest are identified based on keyword matches.

7. The method of claim 5, wherein the locations of interest identify one or more errors in the file.

8. The method of claim 5, wherein the locations of interest identify one or more warnings in the file.

9. A graphical user interface stored on a computer readable storage medium comprising:
   a content display window, wherein the content display window shows content from a file, the file comprising at least one key word or phrase;
   a vertical scroll bar, wherein the scroll bar contains a scroll thumb and a plurality of location objects each of which corresponds to a location of interest within the file having a calculated relative importance value, wherein each of the location objects is about the width of the scroll bar, includes visual indications of a relative importance of the corresponding location in the file based on the calculated relative importance value for the corresponding location, and indicates the relative importance of the corresponding location of interest in comparison to other locations in the file through the use of varying display criteria for location objects based on the relative importance values of the corresponding locations of interest, wherein the relative importance values are calculated by:
      determining the number of times the key word or phrase appears in the file;
      for each of the locations of interest of the file:
         calculating the number of times the key word or phrase appears in the location; and
         dividing the number of times the key word or phrase appears in the location by the number of times a key word or phrase appears in the file to arrive at the relative importance value for the location.

10. The graphical user interface of claim 9, wherein the location objects are uniform horizontal lines within the vertical scroll bar.

11. The graphical user interface of claim 9, wherein the display criteria for a particular location object is varied based on a non-linear function applied to the relative importance of the corresponding location of interest.

12. The graphical user interface of claim 9, wherein the display criteria are user-configurable.

13. An apparatus, comprising:
a display;
a file storage storing a file; and
a processor configured to:
identify locations of interest within the file, the file comprising at least one key word or phrase;
calculate the number of times the key word or phrase appears in the file;
for each of the locations of interest of the file:
calculate the number of times the key word or phrase appears in the location; and
divide the number of times the key word or phrase appears in the location by the number of times the key word or phrase appears in the file
to arrive at a relative importance value for the location; and
cause the display to display a scroll bar having a scroll thumb and a plurality of location objects, wherein each location object is about the width of the scroll bar and corresponds to one of the identified locations of interest within the file having one of the relative importance values, wherein each location object indicates a relative importance of the corresponding identified location of interest to a user without the user needing to scan in any direction other than along the scroll bar, the relative importance based on the relative importance value of the corresponding identified location of interest in the file.

14. The apparatus of claim 13, wherein the processor is further configured to:
cause the display to display a background display criteria in areas of the scroll bar that do not have a location object or a scroll thumb.

15. The apparatus of claim 13, wherein the file is a text file.

16. The apparatus of claim 13, wherein the relative importance of the locations of interest are normalized prior to determining a display criteria to display when displaying the location objects corresponding to the locations of interest.

17. A computer readable storage medium storing executable computer code for using a scroll bar appearance to directly display file information, wherein the computer readable storage medium comprises:
executable computer code for obtaining one or more location criteria comprising a key word or phrase to identify a plurality of desired locations in a file, the file comprising at least one of the key word or phrase;
executable computer code for identifying one or more scroll bar display criteria for changing an appearance of location objects within the scroll bar to designate the plurality of desired locations in the file, wherein each location object is about the width of the scroll bar and corresponds to one of the identified desired locations, each location having a relative importance and wherein the change of appearance of each location object is based upon the relative importance of the corresponding desired location with respect to other location objects, wherein the relative importance of each of the locations is determined by:
determining the number of times the key word or phrase appears in the file;
calculating the number of times the key word or phrase appears in the location; and
dividing the number of times the key word or phrase appears in the location by the number of times the key word or phrase appears in the file;
executable computer code for locating the plurality of desired locations in the file according to the one or more location criteria.

18. The computer readable storage medium of claim 17, further comprising:
executable computer code for obtaining one or more user-defined parameters to which to apply to the display criteria.

19. The computer readable storage medium of claim 17, wherein the display criteria distinguish between relative importance levels at the pixel level.

20. The computer readable storage medium of claim 17, wherein the display criteria distinguish between relative importance levels at the sub-pixel level.

* * * * *

UNITED STATES PATENT AND TRADEMARK OFFICE
CERTIFICATE OF CORRECTION

| | | |
|---|---|---|
| PATENT NO. | : 7,836,408 B1 | Page 1 of 3 |
| APPLICATION NO. | : 10/825251 | |
| DATED | : November 16, 2010 | |
| INVENTOR(S) | : Ollmann et al. | |

It is certified that error appears in the above-identified patent and that said Letters Patent is hereby corrected as shown below:

In column 3, lines 64-67 and in column 4, lines 1-15, delete "File data indicating relative importance of rows in the file may be represented using a variety of data structures. FIG. 8A is a diagram illustrating exemplary data structures used to store file data in accordance with one embodiment of the invention. FIG. 8B depicts a histogram corresponding to the data structures depicted in FIG. 8A in accordance with one embodiment of the invention. FIG. 8C depicts a scroll bar corresponding to the histogram depicted in FIG. 8B in accordance with one embodiment of the invention. Each row is represented by a granule object. Each granule object stores the row's reference count, the linear row reference count, and the non-linear row reference count. In this manner, the processed file data is represented for use in displaying the scroll bar and associated file contents as the user scrolls through the file. Each granule object may also store the text of the row and associated color. It should be noted that the appearance of the scroll bar depicted in FIG. 8C can change dynamically during scrolling when, for example, rows corresponding to granule objects 9-18 (not shown) are displayed."
and
insert -- FIG. 3 is a process flow diagram illustrating a method of displaying a scroll bar in accordance with one embodiment of the invention. As shown at block 302, one or more location criteria used to identify one or more desired locations in the file are obtained. As described above, the location criteria may be used to designate search terms or phrases, as well as other criteria that may be used to ascertain importance or relative importance of rows in the file that correspond to the scroll bar being displayed. One or more display criteria to be applied to designate the one or more desired locations of file are identified at block 304. As described above, the display criteria may designate a color, hue, intensity and/or degree of transparency. One or more desired locations in the file are located according to the location criteria at block 306. The scroll bar is then displayed at block 308 by applying the one or 5 more display criteria to one or more locations of the scroll bar that correspond to the one or more desired locations in the file. The remaining locations of the scroll bar corresponding to remaining locations in the file that do not include the desired locations may be displayed using background display criteria. --, therefor.

In column 6, line 12, delete "FIG. 8" and insert -- FIG. 8A --, therefor.

Signed and Sealed this
Twenty-eighth Day of February, 2012

David J. Kappos
*Director of the United States Patent and Trademark Office*

CERTIFICATE OF CORRECTION (continued)
U.S. Pat. No. 7,836,408 B1

In column 6, line 15, after "invention." insert -- FIG. 8B depicts a histogram corresponding to the data structures depicted in FIG. 8A in accordance with one embodiment of the invention. FIG. 8C depicts a scroll bar corresponding to the histogram depicted in FIG. 8B in accordance with one embodiment of the invention. --.

In column 9, lines 13-42, Delete "13. An apparatus, comprising:
    a display;
    a file storage storing a file; and
    a processor configured to:
    identify locations of interest within the file, the file comprising at least one key word or phrase;
    calculate the number of times the key word or phrase appears in the file;
    for each of the locations of interest of the file:
    calculate the number of times the key word or phrase appears in the location; and
    divide the number of times the key word or phrase appears in the location by the number of times the key word or phrase appears in the file
    to arrive at a relative importance value for the location; and
    cause the display to display a scroll bar having a scroll thumb and a plurality of location objects,
    wherein each location object is about the width of the scroll bar and corresponds to one of the identified locations of interest within the file having one of the relative importance values,
    wherein each location object indicates a relative importance of the corresponding identified location of interest to a user without the user needing to scan in any direction other than along the scroll bar, the relative importance based on the relative importance value of the corresponding identified location of interest in the file." and insert -- 13. An apparatus, comprising:
    a display;
    a file storage storing a file; and
    a processor configured to:
    identify locations of interest within the file, the file comprising at least one key word or phrase;
    calculate the number of times the key word or phrase appears in the file;
    for each of the locations of interest of the file:
    calculate the number of times the key word or phrase appears in the location; and
    divide the number of times the key word or phrase appears in the location by the number of times the key word or phrase appears in the file to arrive at a relative importance value for the location; and
    cause the display to display a scroll bar having a scroll thumb and a plurality of location objects,
        wherein each location object is about the width of the scroll bar and corresponds to one of the identified locations of interest within the file having one of the relative importance values,
        wherein each location object indicates a relative importance of the corresponding identified location of interest to a user without the user needing to scan in any direction other than along the scroll bar, the relative importance based on the relative importance value of the corresponding identified location of interest in the file. --, therefor.